(12) United States Patent
Matsunaga et al.

(10) Patent No.: US 6,230,564 B1
(45) Date of Patent: May 15, 2001

(54) SEMICONDUCTOR ACCELERATION SENSOR AND ITS SELF-DIAGNOSING METHOD (75) Inventors: Tadao Matsunaga; Takashi Kunimi; Masahiro Nezu; Masatomo Mori, all of Tokyo; Masayoshi Esashi, Miyagi, all of (JP)

(73) Assignees: Akebono Brake Industry Co., Ltd., Tokyo (JP); Masayoshi Esashi, Seddai (JP)

( * ) Notice: Subject to any disclaimer, the term of this patent is extended or adjusted under 35 U.S.C. 154(b) by 0 days.

(21) Appl. No.: 09/367,312
(22) PCT Filed: Feb. 18, 1999
(86) PCT No.: PCT/JP99/00725
 § 371 Date: Aug. 11, 1999
 § 102(e) Date: Aug. 11, 1999
(87) PCT Pub. No.: WO99/42843
 PCT Pub. Date: Aug. 26, 1999

(30) Foreign Application Priority Data

Feb. 19, 1998 (JP) .................................................. 10-037303

(51) Int. Cl.$^7$ ............................ G01P 15/00; G01P 21/00; G01P 15/125
(52) U.S. Cl. ...................... 73/514.01; 73/1.38; 73/514.32
(58) Field of Search ........................... 73/514.14, 514.32, 73/1.38, 514.12, 514.13, 514.01

(56) References Cited

U.S. PATENT DOCUMENTS

| 5,095,752 | * | 3/1992 | Suzuki et al. | 73/514.32 |
| 5,243,861 | * | 9/1993 | Kloech et al. | 73/514.32 |
| 5,350,189 | * | 9/1994 | Tsuchitani et al. | 73/514.32 |
| 5,417,312 | * | 5/1995 | Tsuchitani et al. | 73/514.36 |

FOREIGN PATENT DOCUMENTS

| 61-501233 | 6/1986 | (JP) . |
| 4-127574 U | 11/1992 | (JP) . |
| 4-136575 U | 12/1992 | (JP) . |
| 5-188084 | 7/1993 | (JP) . |
| 9-269336 | 10/1997 | (JP) . |
| 10-68742 | 3/1998 | (JP) . |

* cited by examiner

Primary Examiner—Richard A. Moller
(74) Attorney, Agent, or Firm—Morgan, Lewis & Bockius LLP (57) ABSTRACT The invention provides a semiconductor acceleration sensor which is small in size, light in weight, simple in manufacture, low in manufacturing cost, and high in accuracy, and which, with a switch-on time set to a predetermined value, is stable in operation.

In a semiconductor acceleration sensor in which a central board 1 having a central contact section 11, and outside boards 2 at least one of which has an outside contact section 21 are stacked; the central board 1 has a weight 12 near the central contact section 11, and the outside board 2 having the outside contact section 21 has a weight confronting section 11 which confronts with the weight 12, for squeezed damping effect.

7 Claims, 6 Drawing Sheets

SEMICONDUCTOR ACCELERATION SENSOR AND ITS SELF-DIAGNOSING METHOD

TECHNICAL FIELD

The present invention relates to a semiconductor speed sensor, and its self-diagnosing method, and more particularly to a semiconductor acceleration sensor, and its self-diagnosing method which utilizes a squeezed film effect.

1. Background Art

An example of a conventional acceleration sensor employs a ball (like an iron ball). In the sensor, when an acceleration greater than a predetermined value is applied to the sensor, the ball is moved to operate a switch. In another example of the conventional acceleration sensor, a mercury switch is employed (cf. Japanese Utility Patent Application (OPI) No. 4-136575/1992 and 127574 (the term "OPI" as used herein means an "unexamined published application"). Those conventional sensors are bulky, and are made up of a number of components, and therefore it is necessary to determined a particular position to install them, and they are high in manufacturing cost.

An object of the invention is to provide a semiconductor acceleration sensor which is small in size, light in weight, simple in manufacture, low in manufacturing cost, and high in accuracy, and which, with a switch-on time set to a predetermined value, is stable in operation.

2. Description of the Invention

What is provided by the invention is a semiconductor acceleration sensor in which a central board having a central contact section, and outside boards at least one of which has an outside contact section are stacked; in which the central board has a weight near the central contact section, and the outside board having the outside contact section has a weight confronting section which confronts with the weight.

In the semiconductor acceleration sensor of the invention, the weight provides a squeezed damping effect in cooperation with the weight confronting section.

In the semiconductor acceleration sensor, the weight has a central electrode section, and the weight confronting section has an outside electrode section.

Furthermore, what is provided by the invention is a semiconductor acceleration sensor self-diagnosing method which diagnoses the above-described semiconductor acceleration sensor. In the method, voltage is applied across the central electrode section and the outside electrode section to perform self-diagnosis.

In addition, what is provided is a semiconductor acceleration sensor in which a central board having a central contact section, and outside boards at least one of which has an outside contact section are stacked. In the sensor, the central contact section and the outside contact section are welded together when they are brought into contact with each other.

BEST MODE FOR CARRYING OUT THE INVENTION

The invention will be described with reference to its preferred embodiments.

Figure 1:
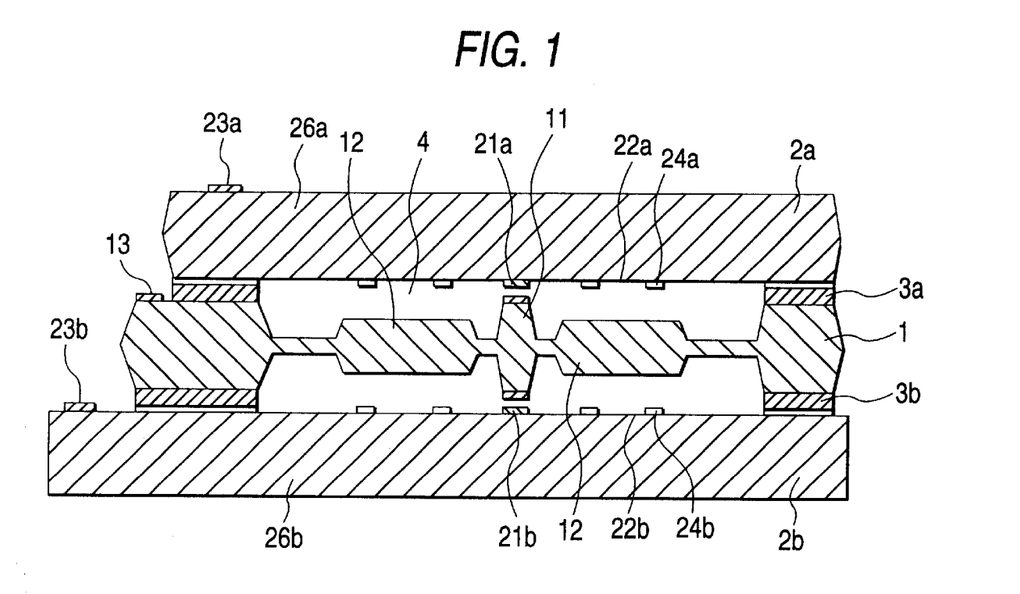
FIG. 1 is an explanatory diagram of an example of a semiconductor acceleration sensor, which constitutes a first embodiment of the invention.
Figure 2:
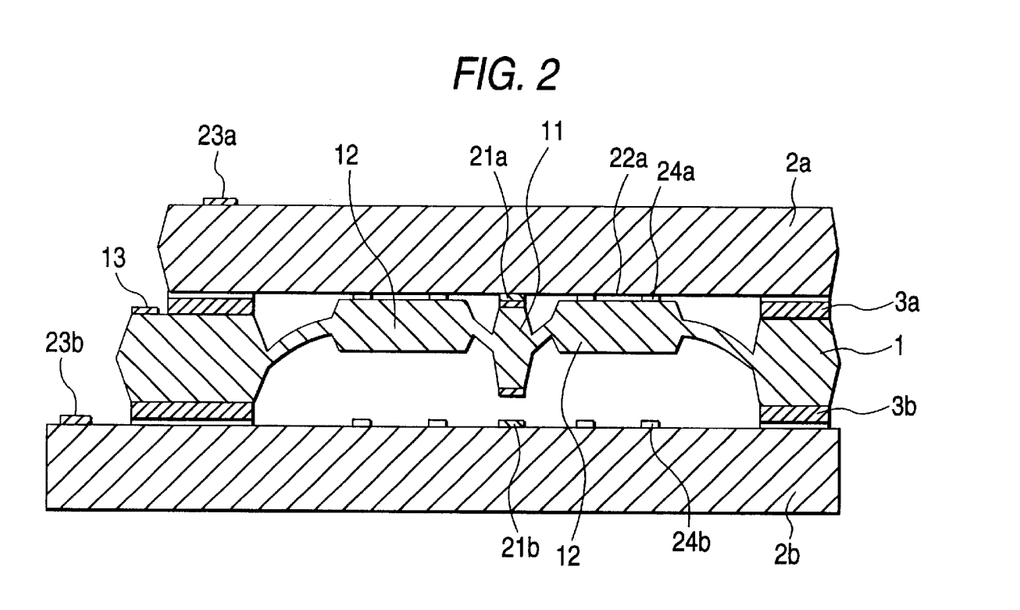
FIG. 2 is an explanatory diagram for a description of the semiconductor acceleration sensor shown in FIG. 1.
Figure 3:
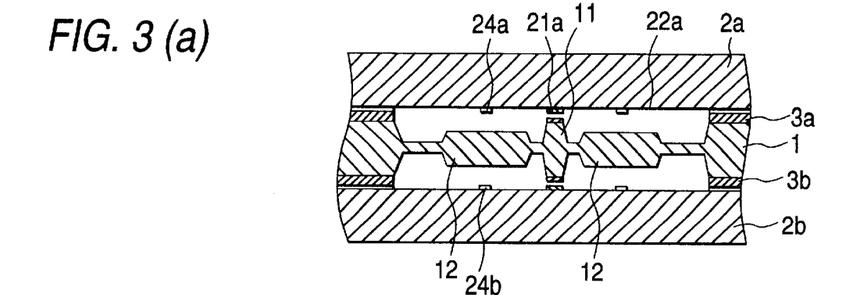
FIGS. 3(a) through 3(e) are explanatory diagrams for a description of the semiconductor acceleration sensor shown in FIG. 1.
Figure 4:
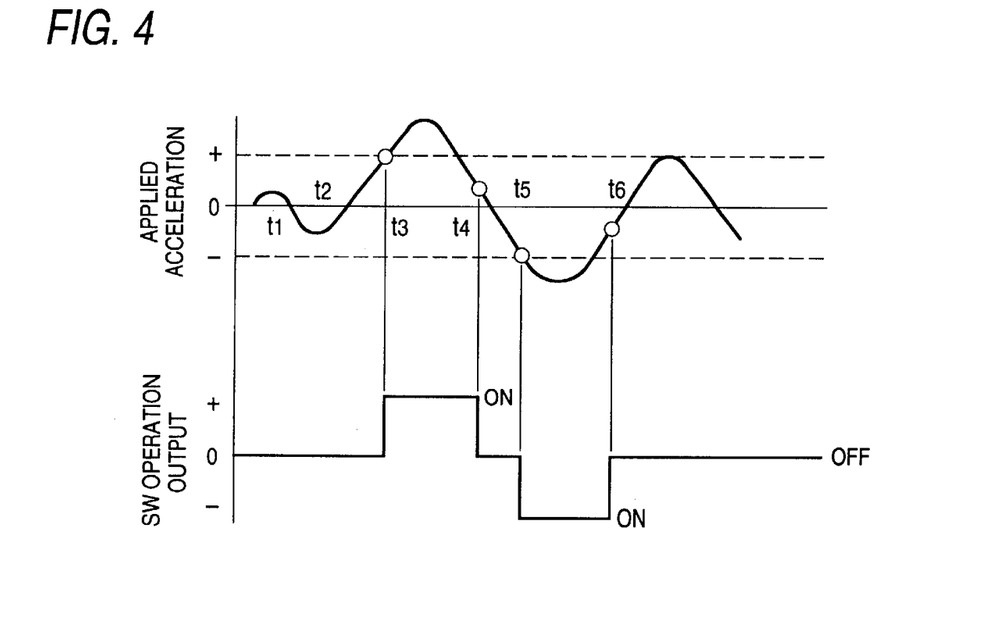
FIG. 4 is an explanatory diagram for a description of a both-direction operation of the semiconductor acceleration sensor shown in FIG. 1.
Figures 5A, 5B, 5C:
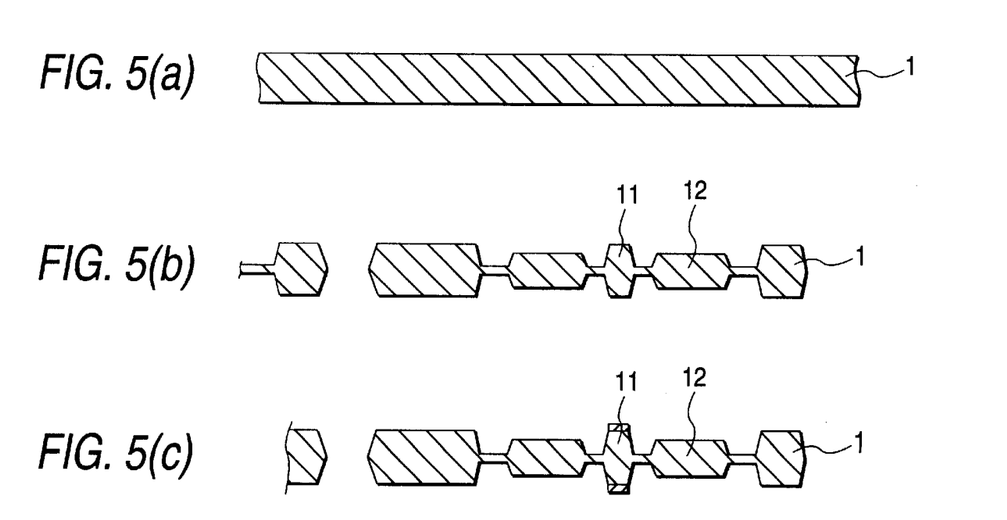
FIGS. 5(a) through 5(c) are explanatory diagrams for a description of the manufacturing steps of the central board of the semiconductor acceleration sensor shown in FIG. 1.
Figure 9:
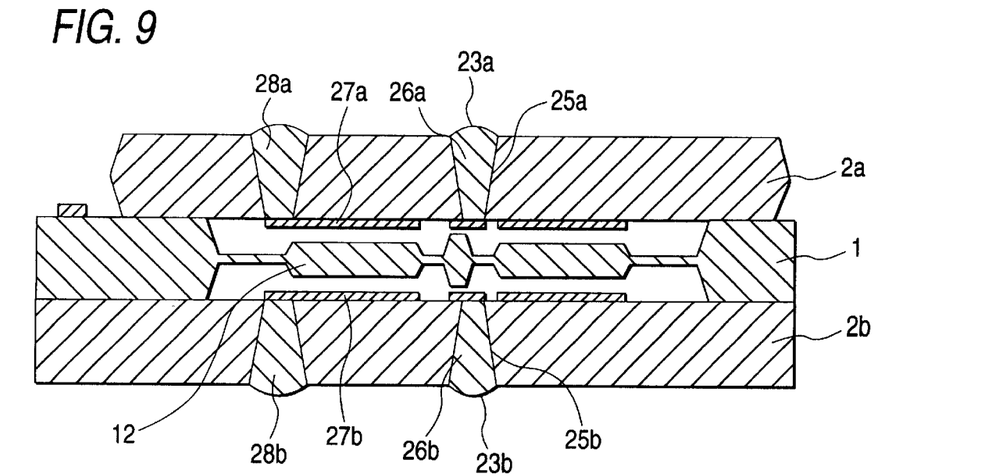
FIG. 9 is an explanatory diagram for a description of another example of the semiconductor acceleration sensor, which constitutes a second embodiment of the invention.
Figure 10:
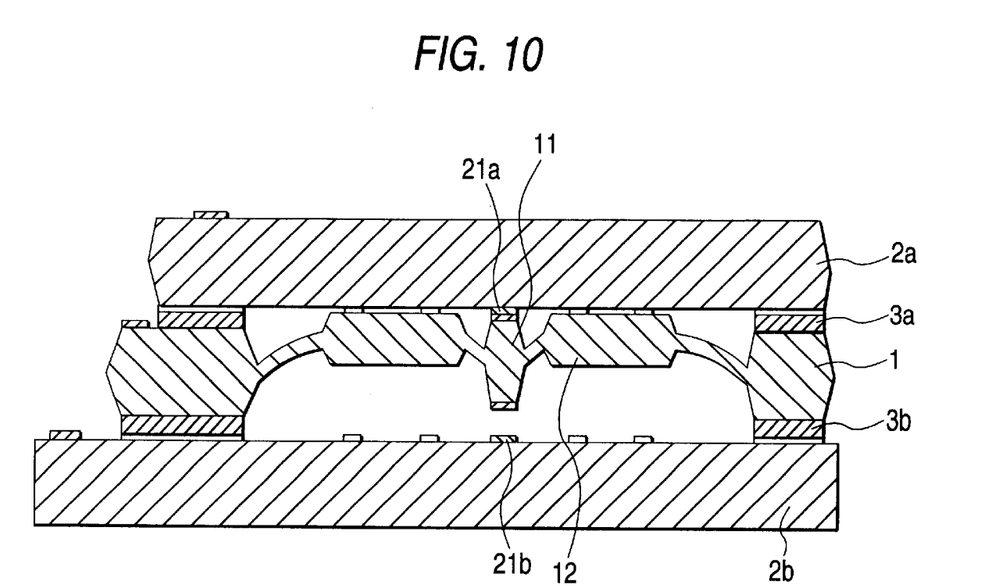
FIG. 10 is an explanatory diagram for a description of the operation of another example of the semiconductor acceleration sensor, which constitutes a third embodiment of the invention.

The semiconductor acceleration sensor and its selfdiagnosing method of the invention will be described with reference to the embodiments. FIG. 1 is an explanatory diagram of an example of a semiconductor acceleration sensor, which constitutes a first embodiment of the invention. FIG. 2 is an explanatory diagram for a description of the semiconductor acceleration sensor shown in FIG. 1. FIGS. 3(a) through 3(e) explanatory diagram for a description of the semiconductor acceleration sensor shown in FIG. 1. FIG. 4 is an explanatory diagram for a description of a both-direction operation of the semiconductor acceleration sensor shown in FIG. 1. FIGS. 5(a) through 5(c) is an explanatory diagram for a description of the manufacturing steps of the central board of the semiconductor acceleration sensor shown in FIG. 1. FIGS. 6(a) through 6(d) is an explanatory diagram for a description of the manufacturing steps of the central board (or the first layer) of the semiconductor acceleration sensor shown in FIG. 1. FIGS. 7(a) through 7(c) is an explanatory diagram for a description of the manufacturing steps of the outside board (or the third layer) of the semiconductor acceleration sensor shown in FIG. 1. FIGS. 8(a) through 8(c) is an explanatory diagram for a description of the assembling steps of the semiconductor acceleration sensor shown in FIG. 1. FIG. 9 is an explanatory diagram for a description of another example of the semiconductor acceleration sensor, which constitutes a second embodiment of the invention, and FIG. 10 is an explanatory diagram for a description of the operation of another example of the semiconductor acceleration sensor, which constitutes a third embodiment of the invention.

The first embodiment will be described with reference to FIGS. 1 through 8. The semiconductor acceleration sensor, the first embodiment, is to detect whether or not an acceleration in the direction of lamination of a layered product is larger than a predetermined value, and, as shown in FIG. 2, comprises a central board 1, outside boards 2a and 2b, and sealing insulation sections 3a and 3b, which form the layered product. The central board 1 is, for instance, made of Si, and includes a central contact section 11, a weight 12, and a central terminal section 13. The outside boards 2a and 2b are, for instance, made of Si, and includes outside contact sections 21a and 21b, weight confronting sections 22a and 22b, and outside terminal sections 23a and 23b. Since the central board 1 and the outside board 2 is made of a conductive material, Si, and therefore the central contact section 11 and the outside contact section 21 are connected to the central terminal section 13 and the outside terminal section 23, respectively. Grooves or holes are formed in the central board 1 by etching or the like so that the central contact section 11 is larger in height than the weight 12, and central contact section 11 is small in area than the weight 12. The weight 12 is, for instance, O-shaped, and is provided near the central contact section 11. The outside contact section 21 and the weight confronting section 22 are confronted with the central contact section 11 and the weight 12, and the weight confronting section 11 has a stopper 24. In FIG. 1, the outside contact sections 21a and 21b are provided on the outside boards 2a and 2b, and are vertically symmetrical with each other; however, outside contact section may be provided on only one of the outside boards. The central board 1 and the outside boards 2a and 2b are spaced a predetermined distance by means of the sealing insulation sections 3a and 3b, and are sealed to form a sensor space 4. The sensor space 4 is filled with a gas such as nitrogen gas and inert gas under a predetermined pressure. The central contact section 11 and the outside contact section 21 are led out of the semiconductor acceleration sensor, respectively, through the central wiring section formed in the weight 12 and the outside wiring section 26 formed in the weight confronting section 22, and through the central terminal section 13 and the outside terminal section 23, and are connected to an external circuit device (not shown).

An acceleration detecting method with the semiconductor acceleration sensor according to the embodiment will be described. When an acceleration is applied to the semiconductor acceleration sensor, the central contact section 11 and the weight 12 are moved thereby. When the acceleration is greater than a predetermined value, the central contact section 11 and the weight 12 are brought into contact with the outside contact section 21 (cf. FIG. 2), so that the fact that the central wiring section and the outside wiring section 26 are conducted to each other can be detected with the external circuit device. That is, it can be determined that the acceleration greater than the predetermined value is applied to the semiconductor acceleration sensor. When the acceleration becomes smaller than the predetermined value, the central contact section 11 is left from the outside contact section 21. In the embodiment, the weight 12 is provided near the central contact section 11, and therefore the weight is also moved in the direction of lamination by the acceleration; that is, it comes near the weight confronting section 22 of the outside board 2, and, owing to the squeezed damping effect, contacts a stopper 24 with a little phase shift (or operation delay). In this case, the weight 22 is spaced a predetermined distance from the weight confronting section owing to the stopper 24. And, when the acceleration is decreased, the weight 12 and the stopper 14 are not immediately left from each other because of the squeezed damping effect, and therefore, as for the external circuit device, it is possible to increase the time of conduction in the semiconductor acceleration sensor. The squeezed damping effect can be determined by the area of the weight confronting section 22, the height of the stopper 24, and the pressure in the sensor space 4. As for the central contact section 11, it is preferable that it is higher than the weight 12, and grooves or holes are formed therein by etching or the like, or the surface is decreased, thereby to decrease the squeezed damping effect. (That is, the on and off operations are not effected without a certain impulse.)

Now, the squeezed damping (or squeezed film) effect will be described. A device or system of the order of microns, may be affected by the nature of a fluid in a minute flow path. If the flow path is narrow, then the surface area is large when compared with the volume, and therefore it is necessary to take into consideration the viscous force of the flow path which is due to the wall surface, and the viscosity of the present fluid itself. The squeezing damping effect is one of them. When the narrow distance between the opposed surfaces is changed, then because of the flow present between those surfaces the force opposite to the force which is in the direction of change is effected, thus resulting in the damping effect. If it is supposed that the damping effect (coefficient)=adhesive strength F, then F=u s v/d where u: viscous coefficient s: area v: speed d: distance It is well known in the art that when d is very small (of the order of microns), $F = u\ s\ v/d^3$.

That is, when the distance d in the gap is small, then the adhesive strength F becomes considerably great. This is called "squeezed film effect". This effect is utilized for the "squeezed damping". This is, the damping is effected with a great force to change the distance in the gap with this effect utilized. This fact is called "squeezed damping".

The operation of the semiconductor acceleration sensor according to the first embodiment will be described with reference to FIG. 3 in detail.

(1) In the case where the acceleration is zero (0)—$t_0$ (FIG. 3(a))

When the acceleration is zero (0), no force is applied to the semiconductor acceleration sensor, and accordingly the central contact section 11 and the weight 12 are not moved.

(2) When the acceleration is applied to the sensor, and the switch is turned on or off—$t_1$ (FIG. 3(b)).

When an acceleration is applied to the semiconductor acceleration sensor, a force is applied to the sensor. When the forcer is greater than a predetermined value, the central contact section 11 is brought into contact with the outside contact section 21. Hence, the external circuit detected that the semiconductor acceleration sensor has been operated. In this operation, since the weight 12 is smaller in height than the central contact section 1, weight 12 is not brought into contact with the stopper 24. With respect to the squeezed film effect acting on the central contact section 11 is small in area, and therefore the squeezed film effect acting on the central contact section 11 scarcely delays. In this case, the delay due to the damping is only mechanical ones.

(3) When the acceleration is further increased—$t_1$ to $t_2$ FIG. 3(c)).

In this case, the weight 12 is brought into contact with the stopper 24, too. Because of the presence of the stopper 24, the weight 12 and the weight confronting section 22 is spaced a predetermined distance.

(4) When the acceleration is decreased—$t_2$ to $t_3$ (FIG. 3(c))

In this case, owing to the squeezed film effect of the fluid which is present in the gap, the central contact section 11 and the weight 12 are kept contacted therewith. Therefore, the time instant the switch (sw) is turned off delays, and the switch "on" time ($t_3$–$t_1$) is longer than the operation time ($t_2$–$t_1$) of the acceleration which is larger than a predetermined value.

(5) When the acceleration is further decreased—$t_3$ –$t_4$ (FIG. 3(a))

In this case, the weight 12 and the central contact section 11 are left from the weight confronting section 22 and the outside contact section 21, so that the switch is turned off.

One example of the operation of the semiconductor acceleration sensor, which is vertically symmetrical as shown in FIG. 1, will be described with reference to FIG. 4.

The semiconductor acceleration sensor thus formed is able to detect an accelerator no matter in what lamination direction (the layered product) it faces. In the case where the acceleration as shown in FIG. 4 is applied to the sensor, at the time instants $t_1$ and $t_2$ the value of the acceleration is less than the predetermined value, and therefore the switch of the semiconductor acceleration sensor is not turned on. At the time instant $t_3$, the upper switch is turned on; at the time instant $t_4$, the switch is turned off; and at the time instant $t_5$, the lower switch is turned on, and at the time instant $t_6$, the switch is turned off.

Now, an example of a method of manufacturing the semiconductor acceleration sensor, the first embodiment, will be described with reference to FIGS. 5 through 8.

The manufacturing work will be described in the following order:

The manufacture of 1) the central board 1, 2) the outside board (the first layer) 2a, and 3) the outside board (the second layer) 2b; and 4) the assembling work of the semiconductor acceleration sensor.

1) The manufacturing work of the central board 1 (cf. FIG. 5)

A Si board is prepared (FIG. 5(a)), and it is subjected to etching or the like to form the central contact section 11 and the weight 12 as required in shape (the part (b) of FIG. 5). Terminals Al and Au are formed on the central contact section 11 by vacuum evaporation or sputtering. Thus, the central board has been formed (FIG. 5(c)).

Figure 6:
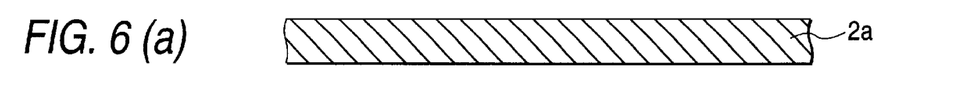
FIGS. 6(a) through 6(d) are explanatory diagrams for a description of the manufacturing steps of the central board (or the first layer) of the semiconductor acceleration sensor shown in FIG. 1.

2) The manufacturing work of the outside board (the first layer) 2a (cf. FIG. 6).

A Si board is prepared (FIG. 6(a)), and a $SiO_2$ or glass layer is formed thereon by sputtering or vacuum evaporation, and the sealing insulation section 3a is formed by photo-lithography (FIG. 6(b)). Next, wiring throughholes 25a are formed by etching or the like, and the stopper 24a is formed with $SiO_2$ (FIG. 6(c)). The outside terminal section 23a is formed by vacuum-evaporating or sputtering Al and Au. Thus, the outside board (the first layer) 2a has been formed (FIG. 6(d)).

Figure 7:
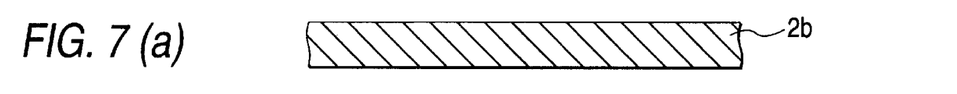
FIGS. 7(a) through 7(c) are explanatory diagrams for a description of the manufacturing steps of the outside board (or the third layer) of the semiconductor acceleration sensor shown in FIG. 1.

3) The manufacturing work of the outside board (the third layer) 2b (cf. FIG. 7).

A Si board is prepared (FIG. 7(a)), and a $SiO_2$ or glass layer is formed thereon by sputtering or vacuum evaporation, and the sealing insulation section 3b is formed by photo-lithography. The stopper 24a is formed with $SiO_2$ (FIG. 7(b)). The outside terminal section 23b is formed by vacuum-evaporating or sputtering Al and Au. Thus, the outside board (the third layer) 2b has been formed (the part (c) of FIG. 7).

Figure 8:
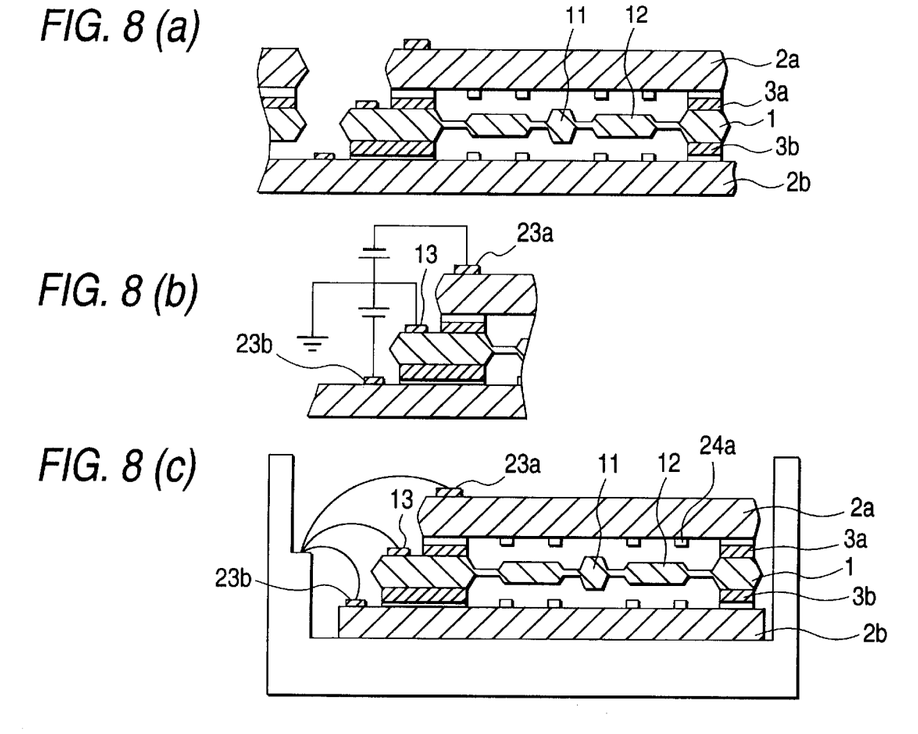
FIGS. 8(a) through 8(c) are explanatory diagrams for a description of the assembling steps of the semiconductor acceleration sensor shown in FIG. 1.

4) The assembling work of the semiconductor accelerator sensor (cf. FIG. 8)

The outside board (the third layer) 2b, the central board 1, and the outside board (the first layer) 2a are stacked one on another in the stated order (FIG. 8(a)), and they are joined together with the sealing insulation sections 3a and 3b by anode joining (FIG. 8(b)). The unit thus obtained is subjected to dicing, and wires from the terminal sections 13, 23a, and 23b are wire-bonded. The unit thus treated is packaged, to assemble the semiconductor accelerator sensor (FIG. 8(c)).

Now, another example of the semiconductor accelerator sensor, which constitutes a second embodiment of the invention, will be described.

As shown in FIG. 9, the sensor includes a central board 1 and outside boards 2a and 2b. Comparing with the first embodiment, in the second embodiment the weight 12 is a central electrode section, and the outside boards 2a and 2b are different from those of the first embodiment. In the second embodiment, the outside boards 2a and 2b are made of insulating material such as glass. And as wiring means to outside terminal sections 23a and 23b, outside wiring sections 26a and 26b are formed in holes 25a and 25b with conductive epoxy, which are formed in the board 2. In the semiconductor acceleration sensor according to the second embodiment, metal (Al, Au and Cr) is vacuum-evaporated or sputtered to form self-diagnosing electrode sections 27a and 27b, and self-diagnosing wiring section 28a and 28b. The self-diagnosing electrode sections 27a and 27b, and self-diagnosing wiring sections 28a and 28b are not connected to the outside wiring sections 26a and 26b.

The self-diagnosing method will be described with reference to the central board 1 and the outside board 2a. When voltage is applied across the central electrode section of the weight 12 and the outside electrode section 27a, the weight 12 is displaced being attracted towards the outside electrode section 27a, so that the electrostatic capacitance is changed. The relation between the applied voltage and the electrostatic capacitance change is utilized for the self-diagnosis of the semiconductor acceleration sensor. More specifically, it can be self-diagnosed whether or not, for instance, the weight 12 is shaped correctly by performing the self-diagnosis at the time of manufacture of the semiconductor acceleration sensor. The outside board 2a is of insulation material, and therefore it will not affect the electrostatic capacitance at the time of self-diagnosis. When, during the manufacture or use, a higher voltage is applied across. the central electrode section of the weight 12 and the outside electrode section 27a, the weight 12 is displaced being attracted by the outside electrode section 27a, so that the centra contact section 11 is brought into contact with the outside contact section 21a; that is, the switch is turned on. Thus, the operations of the semiconductor acceleration sensor and of the external circuit device can be self-diagnosed. The outside electrode section 27a may be utilized as the stopper 24a of the semiconductor acceleration sensor, the first embodiment.

Another example of the semiconductor acceleration sensor, which constitutes a third embodiment of the invention, will be described with reference to FIG. 10. The semiconductor acceleration sensor, the third embodiment, includes: a central board 1, and outside boards 2a and 2b, which form a layered product; and sealing insulation sections 3a and 3b. In the third embodiment, in order that the contacts may be fused by the operating current, the central contact section 11 and the outside contact section 21a are small in electric capacity. This can be achieved by decreasing the areas of the contacts. When the acceleration is increased, so that the central contact section 11 is brought into contact with the outside contact section 21a, the switch is turned on; however, in this case, the contacts are welded together, so that the chattering is eliminated; that is, the semiconductor acceleration sensor is stable in operation. For instance, in the case where it is used as an air bag switch, all that is necessary for it is its operation which is carried out only once. Hence, it may be employed as an air bag switch. During the self-diagnosis, it is preferable that the inspection is carried out with small current; in this case, no problem is involved therewith. In the third embodiment, it is unnecessary that the contacts are large in electric capacity, and therefore the resultant semiconductor acceleration sensor is low in manufacturing cost as much.

Industrial Applicability

According to the invention, a semiconductor acceleration sensor can be provided which is small in size, light in weight, simple in manufacture, low in manufacturing cost, and high in accuracy, and which, with a switch-on time set to a predetermined value, is stable in operation.

What is claimed is:

1. A semiconductor acceleration sensor in which a central board having a central contact section, and outside boards at least one of which has an outside contact section are stacked, CHARACTERIZED in that said central board has a weight near said central contact section, and said outside board having said outside contact section has a weight confronting section which confronts with said weight.

2. A semiconductor acceleration sensor as claimed in claim 1,

CHARACTERIZED in that said weight provides a squeezed damping effect in cooperation with said weight confronting section.

3. A semiconductor acceleration sensor as claimed in claim 1,

CHARACTERIZED in that said weight has a central electrode section, and said weight confronting section has an outside electrode section.

4. A semiconductor acceleration sensor self-diagnosing method which diagnoses said semiconductor acceleration sensor as claimed in claim 3, CHARACTERIZED in that voltage is applied across said central electrode section and said outside electrode section to perform selfdiagnosis.

5. A semiconductor acceleration sensor in which a central board having a central contact section, and outside boards at least one of which has an outside contact section are stacked, CHARACTERIZED in that said central contact section and said outside contact section are welded together when said central contact section and said outside contact section brought into contact with each other.

6. A semiconductor acceleration sensor as claimed in claim 2,

CHARACTERIZED in that said weight has a central electrode section, and said weight confronting section has an outside electrode section.

7. A semiconductor acceleration sensor self-diagnosing method which diagnoses said semiconductor acceleration sensor as claimed in claim 6, CHARACTERIZED in that voltage is applied across said central electrode section and said outside electrode section to perform self-diagnosis.

* * * * *